United States Patent [19]

Robinson et al.

[11] Patent Number: 4,523,385
[45] Date of Patent: Jun. 18, 1985

[54] LATCH

[75] Inventors: Allan F. Robinson, Sydney; Warwick A. Hunter, Grose Wold, both of Australia

[73] Assignee: Napintas Pty. Ltd., New South Wales, Australia

[21] Appl. No.: 514,830

[22] PCT Filed: Oct. 26, 1982

[86] PCT No.: PCT/AU82/00173
§ 371 Date: Jun. 27, 1983
§ 102(e) Date: Jun. 27, 1983

[87] PCT Pub. No.: WO83/01493
PCT Pub. Date: Apr. 28, 1983

[30] Foreign Application Priority Data

Oct. 26, 1981 [AU] Australia ............. PF1306

[51] Int. Cl.³ ............................... G01C 15/00
[52] U.S. Cl. .............................. 33/296; 403/109
[58] Field of Search ............. 33/296, 158, 464, 161; 403/109, 107, 106, 110, 321, 373, 377, 393

[56] References Cited

U.S. PATENT DOCUMENTS

| 1,824,023 | 9/1931 | Langsner | 33/296 |
| 1,971,751 | 8/1934 | Keuffel | 33/296 |
| 2,909,839 | 10/1959 | Miller | 33/296 |
| 3,120,386 | 2/1964 | Janssen | 403/107 |
| 4,029,279 | 6/1977 | Nakatani | 403/109 |

FOREIGN PATENT DOCUMENTS 1116803 6/1968 United Kingdom ............. 33/161

Primary Examiner—Willis Little
Attorney, Agent, or Firm—Hubbell, Cohen, Stiefel & Gross

[57] ABSTRACT

A latch of the over centre type for use inter alia in locking together surveyors rods in order to give reproducible measurements. The latch locks together a first axially slidable member (2) and a second axially slidable member (8) in overlapping disposition; it comprises a pair of latch supporting pivots (22) extruding from the first member, on a first common axis a pair of latch fulcrum pivots (26) extruding from the second member on an axis parallel to the first axis, a latch arrester (30) extruding from the first member, a latch body (16) having a face and sides (18) which extend to or past the latch fulcrum pivots (26) each latch side having an S-shaped recess (24) to engage the associated fulcrum pivot and an elongated slot (20) to engage the elongated latch support pivot. At least one of the sides has an edge protrusion (34) which must be snapped past the latch arrester (30) to complete the latch action. The latch is captive on the first member (2) and slidable with that member to a locking position where the latch is tilted around the fulcrum pivots (26) whereupon the latch causes the distance between the two axes of the members (2, 8) to change locking them together in an over centre action, which action cannot be reversed except by snapping the protrusion (34) past the latch arrester (30).

30 Claims, 1 Drawing Figure

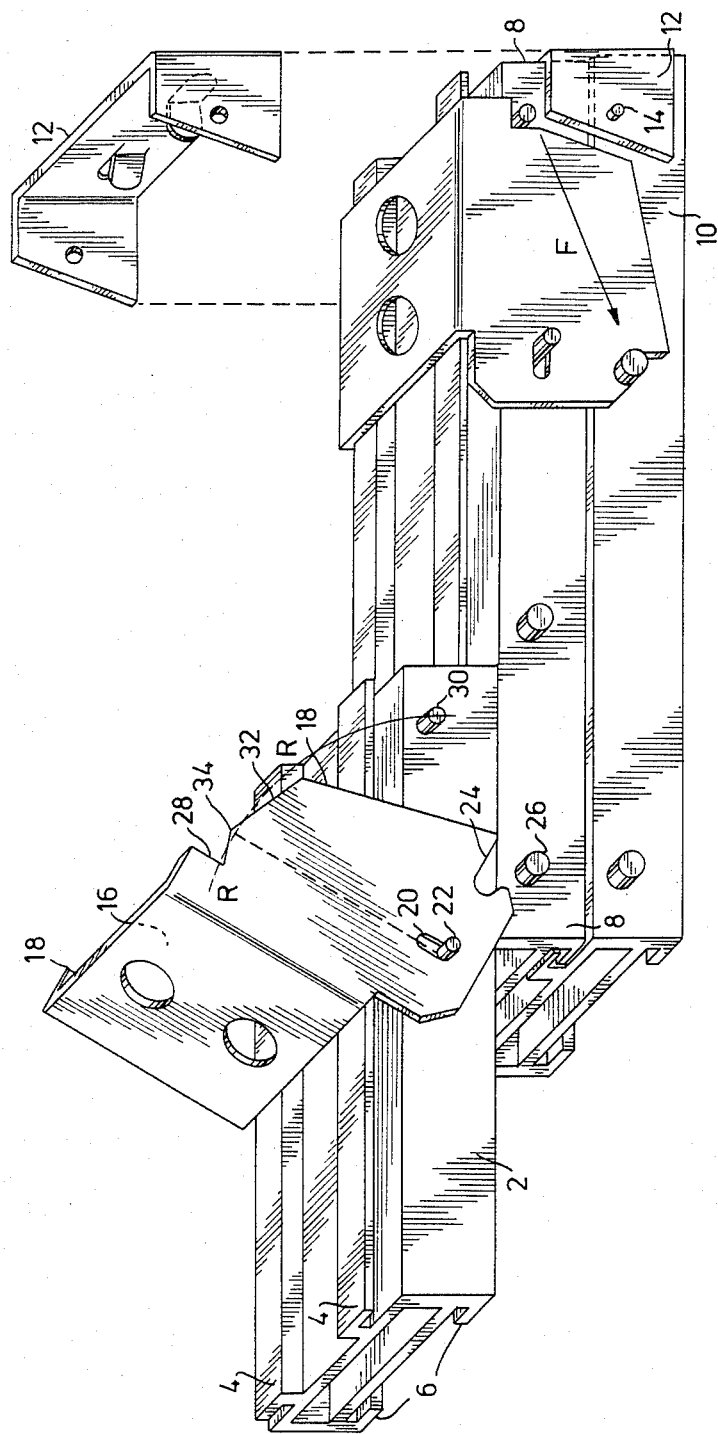

LATCH

This invention concerns latches especially latches which lock by an over centre action.

Although the latch is applicable to extending tripods, ladders, automatic firearms and the like, the latch will be described with particular reference to applications where the latch must exert a clamping action which can be applied and released frequently. One example of such an application is a surveyor's rod which consists of two or more mutually connected sliding calibrated sections which when extended for taking readings rely upon a clamping latch to lock the overlapping lengths of the rod sections in a reproducible position. Over the lifetime of the rod thousands of operations of the latch occur. No slip is permissable between the sections when latched closed and rod is in extended position.

Broadly the invention provides a latch of the over centre type adapted to mutually lock a first and second inter engaged, axially slidable members in an axially overlapping disposition by utilising a first pivot axis on the first member and a second parallel pivot axis on the second member characterised in that the latch straddles the two members, is connected to the first member by a pair of pin and slot connections at the first pivot axis, is adapted to engage fulcrum means at a second axis in the second member and extends from the zone of the two axes like a lever whereby the latch is tiltable between a release position wherein the members are slidable and a locked position where the distance between the two axes changes and in doing so locks the members together and a latch arrester holds the latch closed.

More particularly the invention provides a latch of the over centre type adapted to mutually lock a first and second interengaged, axially slidable members in an axially overlapping disposition comprising:

(a) a pair of transversely disposed latch-supporting pivots extending from the first member along a first common transverse axis;

(b) a pair of latch fulcrum pivots extending from the second member along a second common transverse axis which is parallel to the first transverse axis;

(c) a latch arrester extending from the first member which constitutes with the other two pairs of pivots a triangular disposition of parts;

(d) a latch body having a face and a pair of sides which extend to or past the latch fulcrum pivots; each side having recess means to engage the associated fulcrum pivot and an elongated slot to engage the associated latch support pivot and at least one of the sides having an edge protrusion, which protrusion must be snapped past the latch arrester to complete the latch action, the arrangement being that for adjustment the first member together with the captive latch body is free to slide relative to the second member, but when the members reach a desired overlap position, the first recess means in each latch side engages the associated fulcrum pivot and the body becomes tiltable about the latter, like ends of the slots engage the latch-supporting pivots drawing the first member in a locking direction, the protrusion is snapped past the latch arrester which urges the first member together with the latch-support pivots further in the locking direction, such further movement being permitted by travel of the pivots in the slots and causing an over centre clamping action, such action being irreversible except by snapping the latch body past the protrusion.

Each pair of pivots may be constituted by a single pin the ends of which project from the sides of the rod so as to provide a pair of supports on a common axis. Thus the pins may be conveniently pressed in the holes drilled in the members. Conversely the latch has projections which engage recesses or dimples in the members. Such connections are cheap and convenient for application to a surveyor's rod where specific latching sites are required but when any overlap position is required instead, the second member has a longitudinal groove in each sidewall thereof and the latch has a pair of projections which slide in the grooves.

One embodiment of the invention is now described with reference to the single FIGURE of the accompanying drawing which is a perspective view of a triple member surveyor's rod with two latches, one shown in the open position, the other being shown in the closed position.

The first member 2 is a pvc box extrusion with a pair of top guides 4 and a pair of bottom guides 6. This construction is common to the second and third members 8, 10. The members interengage to form an extendible surveying rod with a three-part tape scale (not shown) located between guides 6. The lowermost member 10 has its base end protected by a metal channel plate 12 secured to the sides of the member by a pin 14 and stabilised by pressed out lugs which engage internally in the member 10.

The latch consists of a sheet metal latch body with a face 16 and a pair of parallel sides 18. Each side has an elongated slot 20 which is parallel to the face 16 and which receives the projecting ends of a transverse latch body supporting pin 22. The pin is a press fit through a hole in the first member. The sides each have a hooked recess 24 for the purpose of engaging the projecting ends of a fulcrum pin 26 which is a press fit in the second member.

The sides each have an angular recess 28 which engages the projecting ends of a latch arresting pin 30 which is retained in the first member. The recess 28 meets the inclined loading edge 32 at an obtuse peak 34 providing a protrusion to be snapped past the arresting pin. The snap distance can be judged by the projection of corner 34 above the arc R-R locus of radius pin 22 and near face of pin 30.

The latch works as follows:

The latch body to the top is shown in the release position with the recesses 24 in the body, desengaged from the fulcrum pin ends 26, the latch face lying clear of the guides 4 and the support pin ends 22 lying at the forward ends of slots 20. As the latch closes the slots draw top member 2 rearwards. The inclined edges 32 engage arrester pin 30 which drives the member 2 rearwards to complete the locking action. The completion of the locking action is made possible by the movement of the pins 22 towards the opposite ends of the slots 20. Peaks 34 snap over the arrester pins. The latch body lies flat parallel to guides 4 with the rear ends of the slots 20 against pin 22. The locking action is exerted between guides 6 of member 2 and guides 4 of member 8. When the latch is in the locking position the distance between pin ends 26 and pin ends 22 increases thus tending to separate members 2 and 8. The separating force locks the guides and holds the members in the predetermined overlap position. In order to open the latch the user grips the latch body and tilts it about pin ends 26.

When the latches are engaged and the rod is in use the vertical compression axial load on the lower latch, for example, passes from the upper member 2 through pin 22 to the latch body, thence through 26 to the adjacent member 8. Self closing moment induced from pins 26 and 22 is arrested by pin 30 against recess 28.

Axial forces in the opposite direction (tension) are defeated from applying a self opening turning moment between pins 22 and 26 by provision of a load relieving slot 20 about pin 22. Additionally the geometry of angular recess 28 maintains pin 30 captive, as in pin 26 in the latch body. The resultant force "F" passes between pins 26 and 30 (in adjacent members) and there is no turning moment on the latch body tending to cause unassisted release.

The small clearance between pin ends 30 and near face of recess 28 (relative to pin 22) is created by the captive angle of the recess 28 relative to the tangent to radius about pin 26, and the provision of a snap close action over corner 34 with respect of radius about pin 22. This clearance may be kept to a minimum by the offset of pins 22 and 30 from the longitudinal axes of the rod.

We have found the advantages of the above embodiment to be as follows:

1. A standard three part rod may be used as a one, two or three part item or further extensions may be added because the parts are easily assembled and disassembled;
2. The locking action is fast and reliable and operable by a user wearing gloves;
3. The latch contains no threaded parts, springs or sliding register pins which fare badly on site;
4. Sliding members cannot be "false" latched out of position. Any "part latching" is readily apparent, obviating possibility of a false height reading.
5. The latch closes to the rod enabling the rod to be placed flush against a wall during measurement.

In another embodiment the latch clamps by pulling the extrusions together in contrast to the embodiment above where latch clamps the extrusions by pushing them apart.

In this specification, the term "pin" means any projection which forms an axis about which the latch works. Normally a single pin is utilised which projects beyond the width of the extrusions and the ends of the pin are the surfaces which are engaged by the latch.

We claim:

1. A latch of the over centre type adapted to mutually lock first and second interengaged, axially slidable members in an axially overlapping disposition by utilizing a first pivot axis on the first member and a second parallel pivot axis on the second member, characterised in that the latch straddles the two members, a pair of pin and slot connections connects the latch to the first member at the first pivot axis, fulcrum means is adapted for engagement with the latch at a second axis in the second member, and the latch extends from the zone of the two axes like a lever whereby the latch is tiltable between a release position wherein the members are slidable and a locked position where the distance between the two axes changes and in doing so locks the members together, and a latch arrester holds the latch closed.
2. A latch of the over centre type adapted to mutually lock a first and second interengaged, axially slidable members in an axially overlapping disposition comprising:
    (a) a pair of transversely disposed latch-supporting pivots extending from the first member along a first common transverse axis;
    (b) a pair of latch fulcrum pivots extending from the second member along a second common transverse axis which is parallel to the first transverse axis:
    (c) a latch arrester extending from the first member which constitutes with the other two pairs of pivots a triangular disposition of parts;
    (d) a latch body having a face and a pair of sides which extend to or past the latch fulcrum pivots; each side having recess means to engage the associated fulcrum pivot and an elongated slot to engage the associated latch support pivot and at least one of the sides having an edge protrusion, which protrusion must be snapped past the latch arrester to complete the latch action, the arrangement being that for adjustment the first member together with the captive latch body is free to slide relative to the second member, but when the members reach a desired overlap position, the first recess means in each latch side engages the associated fulcrum pivot and the body becomes tiltable about the latter, like ends of the slots engage the latch-supporting pivots drawing the first member in a locking direction, the protrusion is snapped past the latch arrester which urges the first member together with the latch-support pivots further in the locking direction, such further movement being permitted by travel of the pivots in the slots and causing an over centre clamping action, such action being irreversible except by snapping the latch body past the protrusion.
3. A latch as claimed in claim 2 wherein the latch is of channel shaped cross-section.
4. A latch as claimed in claim 2 wherein the recess means is a S-shaped notch in the side of the latch body which provides a seat for a projecting fulcrum, a fulcrum guide edge which obstructs the fulcrum projection tending to seat the tilting latch body on the fulcrum projection during latching and a release edge which facilitates release of the notch from the fulcrum projection during unlatching.
5. A latch as claimed in claim 3 wherein the recess means is a S-shaped notch in the side of the latch body which provides a seat for a projecting fulcrum, a fulcrum guide edge which obstructs the fulcrum projection tending to seat the tilting latch body on the fulcrum projection during latching and a release edge which facilitates release of the notch from the fulcrum projection during unlatching.
6. A latch as claimed in claim 2 wherein the edge protrusion is an obtuse peak.
7. A latch as claimed in claim 3 wherein the edge protrusion is an obtuse peak.
8. A latch as claimed in claim 4 wherein the edge protrusion is an obtuse peak.
9. A latch as claimed in claim 5 wherein the edge protrusion is an obtuse peak.
10. A latch as claimed in claim 6 wherein the leading edge of the peak is inclined transversely to the longitudinal axes of the members in order to apply the over centre clamping action in a progressive manner.
11. A latch as claimed in claim 7 wherein the leading edge of the peak is inclined transversely to the longitudinal axes of the members in order to apply the over centre clamping action in a progressive manner.
12. A latch as claimed in claim 8 wherein the leading edge of the peak is inclined transversely to the longitudinal axes of the members in order to apply the over centre clamping action in a progressive manner.

13. A latch as claimed in claim 9 wherein the leading edge of the peak is inclined transversely to the longitudinal axes of the members in order to apply the over centre clamping action in a progressive manner.

14. A latch as claimed in claim 10 wherein the peak and the latch fulcrum pivot axis lie on a common axis which is parallel to the longitudinal axes of the members.

15. A latch as claimed in claim 11 wherein the peak and the latch fulcrum pivot axis lie on a common axis which is parallel to the longitudinal axes of the members.

16. A latch as claimed in claim 12 wherein the peak and the latch fulcrum pivot axis lie on a common axis which is parallel to the longitudinal axes of the members.

17. A latch as claimed in claim 13 wherein the peak and the latch fulcrum pivot axis lie on a common axis which is parallel to the longitudinal axes of the members.

18. A latch body as claimed in claim 6 wherein both latch sides have corresponding obtuse peaks and the latch arrester is a pin both sides of which project from the first member in order to arrest the latch body symmetrically.

19. A latch body as claimed in claim 7 wherein both latch sides have corresponding obtuse peaks and the latch arrester is a pin both sides of which project from the first member in order to arrest the latch body symmetrically.

20. A latch body as claimed in claim 8 wherein both latch sides have corresponding obtuse peaks and the latch arrester is a pin both sides of which project from the first member in order to arrest the latch body symmetrically.

21. A latch body as claimed in claim 9 wherein both latch sides have corresponding obtuse peaks and the latch arrester is a pin both sides of which project from the first member in order to arrest the latch body symmetrically.

22. A latch body as claimed in claim 10 wherein both latch sides have corresponding obtuse peaks and the latch arrester is a pin both sides of which project from the first member in order to arrest the latch body symmetrically.

23. A latch body as claimed in claim 11 wherein both latch sides have corresponding obtuse peaks and the latch arrester is a pin both sides of which project from the first member in order to arrest the latch body symmetrically.

24. A latch body as claimed in claim 12 wherein both latch sides have corresponding obtuse peaks and the latch arrester is a pin both sides of which project from the first member in order to arrest the latch body symmetrically.

25. A latch body as claimed in claim 13 wherein both latch sides have corresponding obtuse peaks and the latch arrester is a pin both sides of which project from the first member in order to arrest the latch body symmetrically.

26. A latch body as claimed in claim 14 wherein both latch sides have corresponding obtuse peaks and the latch arrester is a pin both sides of which project from the first member in order to arrest the latch body symmetrically.

27. A latch body as claimed in claim 15 wherein both latch sides have corresponding obtuse peaks and the latch arrester is a pin both sides of which project from the first member in order to arrest the latch body symmetrically.

28. A latch body as claimed in claim 16 wherein both latch sides have corresponding obtuse peaks and the latch arrester is a pin both sides of which project from the first member in order to arrest the latch body symmetrically.

29. A latch body as claimed in claim 17 wherein both latch sides have corresponding obtuse peaks and the latch arrester is a pin both sides of which project from the first member in order to arrest the latch body symmetrically.

30. A latch as claimed in any one of the preceding claims wherein the reverse edge of the obtuse peak terminates in a recess stop which limits the tilt of the latch body during the clamping action.

* * * * *